(No Model.)
J. VOWLES.
POTATO SCOOP.
No. 421,021. Patented Feb. 11, 1890.
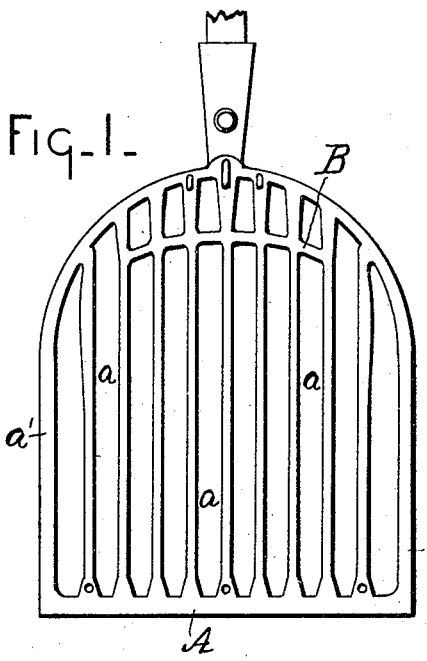
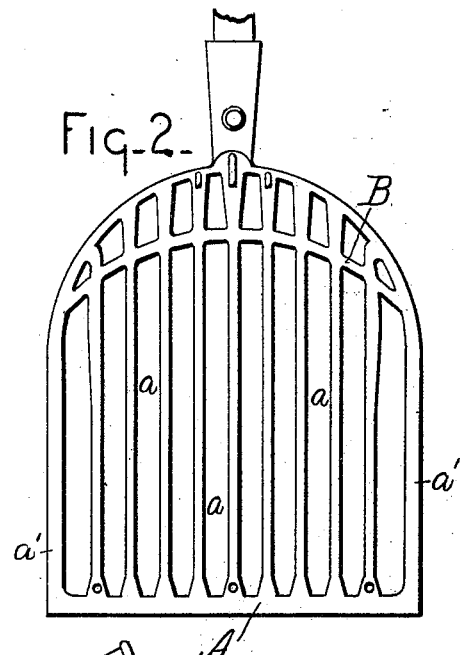
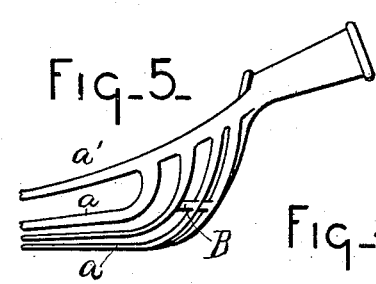
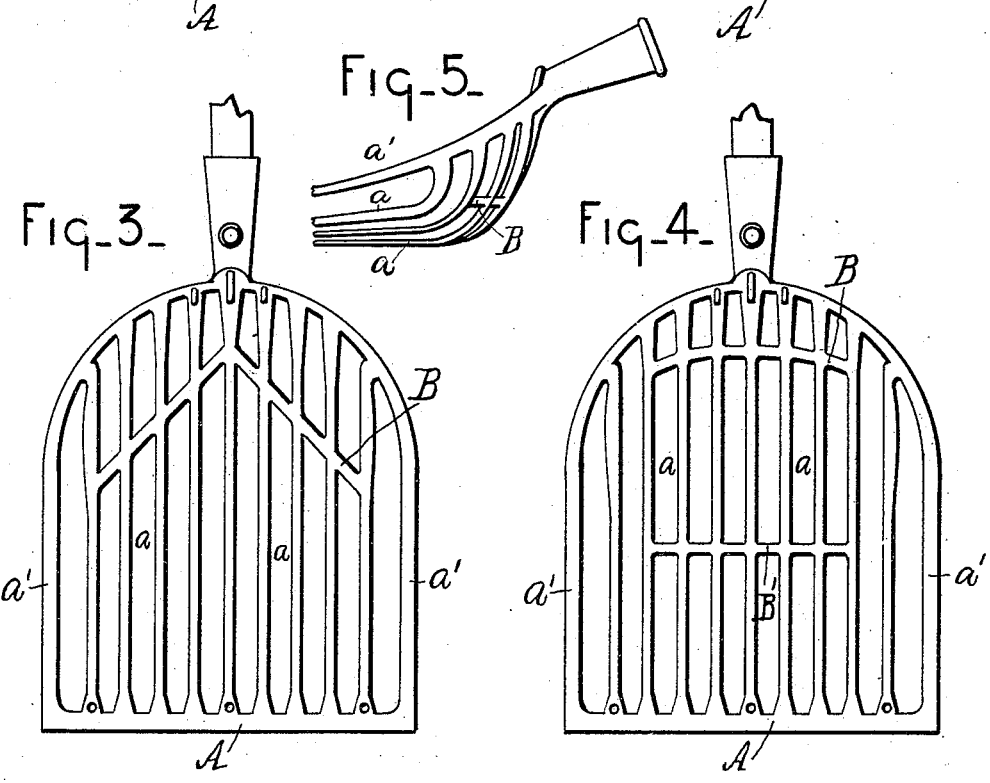
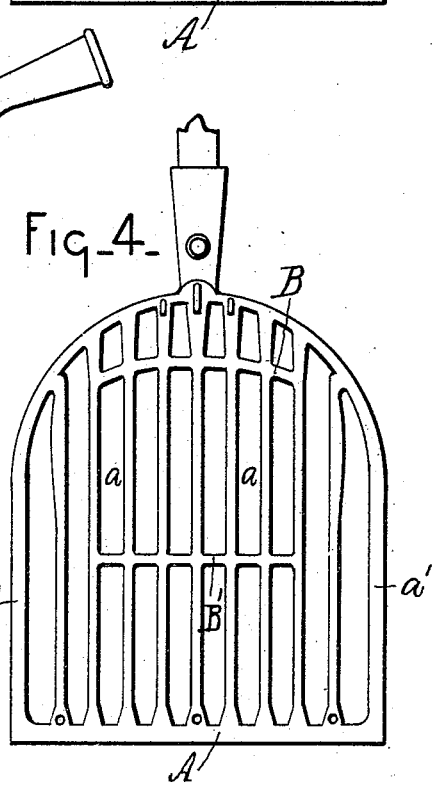
WITNESSES
C. J. Shipley
F. W. Falkiner
INVENTOR
Joseph Vowles
By Wells W. Leggett & Co
Attorneys.

UNITED STATES PATENT OFFICE.

JOSEPH VOWLES, OF MILFORD, MICHIGAN.

POTATO-SCOOP.

SPECIFICATION forming part of Letters Patent No. 421,021, dated February 11, 1890.

Application filed November 4, 1889. Serial No. 329,169. (No model.)

*To all whom it may concern:*

Be it known that I, JOSEPH VOWLES, a citizen of the United States, residing at Milford, county of Oakland, State of Michigan, have invented a certain new and useful Improvement in Potato-Scoops; and I declare the following to be a full, clear, and exact description of the invention, such as will enable others skilled in the art to which it pertains to make and use the same, reference being had to the accompanying drawings, which form a part of this specification.

In the drawings, Figure 1 shows a scoop embodying my invention. Fig. 2 shows a variation in which the cross-bar extends the whole distance between the sides. Fig. 3 illustrates a variation in which the direction of the cross-bar is changed. Fig. 4 is another variation in which there is an additional cross-bar nearer the edge of the scoop. Fig. 5 is a side elevation of a portion.

This invention has for its object to improve the scoop patented to me October 1, 1889, No. 411,879.

I found by use of my former scoop that the tines had a tendency to separate and to spring laterally and vertically at or near the point of curvature, and that this was particularly noticeable in attempting to lift a heavy load. By experiment I have discovered that this tendency is corrected by rigidly connecting the tines by a cross-bar at or near the point where they start to curve toward the handle, and that it so strengthens the scoop that with this single change I am enabled, without any material yielding of the scoop, to raise a very much heavier load without any appreciable increase in the weight of the scoop and without closing the space at the heel between the tines. I also find that it is only necessary in practice to unite those tines between the outer ones, and not to unite them to the outer ones, although in this respect I would not be limited, nor would I be limited to the use of a single cross-bar.

In carrying out my invention, A represents my scoop; $a$, its intermediate tines, and $a'$ outer tines.

B represents my cross-bar, which is cast integral with the tines, and, as shown in Fig. 1, extends across the intermediate tines, but not to the outer tines. It may, however, extend to the outer tines, as shown in Fig. 2, if desired, although I prefer the other form, since the intermediate tines naturally yield together and in the same direction, while the outer tines are more in the nature of braces or sides, and do not yield in the same way as the intermediate ones. So, also, as shown in Fig. 3, the cross-bar, whether extending wholly or partially across, as above described, may, if desired, take a devious course across the tines instead of going straight across, and another cross-bar B' may, if desired, be formed across the tines near the scooping edge, as shown, Fig. 4.

What I claim is—

1. A scoop consisting of tines united at the scooping edge and extending back to the heel, and a cross bar or bars made integral therewith between the said edge and heel, substantially as and for the purposes described.

2. A scoop consisting of tines united at the scooping edge and extending back to the heel, and a cross-bar integral therewith extending across the intermediate tines near the point where they curve upward, substantially as described.

In testimony whereof I sign this specification in the presence of two witnesses.

JOSEPH VOWLES.

Witnesses:
W. H. CHAMBERLIN,
L. A. DOELTZ.